United States Patent Office 3,037,853
Patented June 5, 1962

3,037,853
HERBICIDAL COMPOSITION AND METHOD EMPLOYING A MIXTURE OF ETHYL N,N-DIPROPYLTHIOLCARBAMATE AND A HERBICIDAL s-TRIAZINE
Raymond Wilson Luckenbaugh, Wilmington, Del., assignor to E. I. du Pont de Nemours and Company, Wilmington, Del., a corporation of Delaware
No Drawing. Filed Apr. 4, 1958, Ser. No. 726,329
3 Claims. (Cl. 71—2.5)

This invention relates to the discovery that a combination of at least one herbicidal s-triazine with EPTC surprisingly has herbicidal power not possesed by either component employed separately.

When, in accordance with the invention, an herbicidal s-triazine compound is combined with EPTC, there is produced an herbicidal combination which is more effective as a weed killer than either herbicide alone. In combination, these two types of herbicides co-act to give synergistic herbicidal activity. The result is that the combination has enhanced herbicidal effectiveness giving better kill and less regrowth using smaller amounts of the combination than by using either herbicidal component separately at equivalent rates.

This enhanced effectiveness is particularly surprising as regards the superior residual herbicidal effectiveness of the combinations. For example, these combinations are useful for the pre-emergence control of weeds in crop areas. Usually, one application of these combinations is sufficient to control weeds for an entire season. Crops are unexpectedly tolerant to these combinations.

More particularly, the invention is directed to herbicidal compositions and methods employing a mixture of EPTC with at least one herbicidally active s-triazine represented by the following formula:

(1) 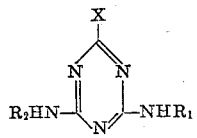

where:

X is selected from the group consisting of chlorine, methoxy, and methylthio,
$R_1$ and $R_2$ are the same or different and are selected from the group consisting of alkyl radicals containing less than four carbon atoms, and the radical $$-(CH_2)_n-OCH_3$$

and $n$ is an integer selected from the group consisting of 2 and 3.

Illustrative of the herbicidally active triazines of Formula 1 are:

2,4-bis(methylamino)-6-chloro-1,3,5-triazine
2,4-bis(ethylamino)-6-chloro-1,3,5-triazine
2,4-bis(propylamino)-6-chloro-1,3,5-triazine
2-chloro-4-isopropylamino-6-methylamino-1,3,5-triazine
2,4-bis(2-methoxyethylamino)-6-chloro-1,3,5triazine
2,4-bis(3-methoxypropylamino)-6-chloro-1,3,5-triazine
2 - chloro - 4 - (2-methoxyethylamino)-6-(3-methoxypropylamino)-1,3,5-triazine
2 - chloro - 4 - ethylamino-6-(3-methoxypropylamino)-1,3,5-triazine
2,4-bis(ethylamino)-6-methylthio-1,3,5-triazine
2,4-bis(3-methoxypropyl)-6-methylthio-1,3,5-triazine
2,4-bis(ethylamino)-6-methoxy-1,3,5-triazine
2,4-bis(3-methoxypropyl)-6-methoxy-1,3,5-triazine The best herbicidally active s-triazine for use with my compositions and methods are:

2,4-bis(ethylamino)-6-chloro-1,3,5-triazine
2,4-bis(3-methoxypropylamino)-6-chloro-1,3,5-triazine
2-chloro - 4 - ethylamino-6-(methoxypropylamino)-1,3,5-triazine
2,4-bis(ethylamino)-6-methoxy-1,3,5-triazine
2,4-bis(3-methoxypropyl)-6-methylthio-1,3,5-triazine.

The other herbicidally active component employed in the compositions and methods of the invention is EPTC, which is the trade name for N,N-dipropyl thiolcarbamic acid, ethylester compound, a compound having the structural formula:

(2) 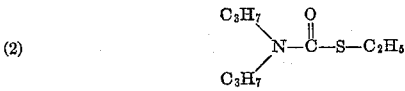

In operating in accordance with the present invention, any suitable amount of herbicidal s-triazine can be employed in combination with EPTC to obtain compositions in which the two herbicidal components are mutually activating. The relative proportions of the active components will vary depending upon the particular s-triazine employed, the plant species to be controlled, the physiological age of the plants, the prevailing climatic conditions, etc. It is impossible, therefore, to state exactly the proportions that will be used in all situations; and, indeed, the exact amounts of toxicants in the mixture do not appear to be critical. In general, however, the compositions of the invention will contain from about 0.20 to 10.0 parts by weight of EPTC for each part by weight of s-triazine. In terms of proportions, the relative amounts of each respective herbicidal component can be said to be from about 10:1 to 1:5, the ratios indicating the amount of EPTC to triazine.

It is much preferred to formulate the active components of the invention, comprising herbicidal s-triazine compounds with EPTC, with conventional pest control adjuvants, modifiers or diluents, hereinafter called inert carriers, because handling is facilitated and herbicidal action is thereby frequently enhanced. Such herbicidal compositions or formulations are prepared in the form of powdered solids or liquids.

These compositions, whether solutions, emulsions, dispersions of the active components in a liquid solvent, or wettable powders, often have as an inert carrier one or more of the surface-active agents in amounts sufficient to render a given composition containing the active component readily dispersible in water or in oil. By the term "surface-active agent" it is understood that wetting agents, dispersing agents, suspending agents and emulsifying agents are included.

Suitable surface-active agents are set out, for example, in Searle U.S. Patent No. 2,526,417, Todd U.S. Patent No. 2,655,447, Jones U.S. Patent No. 2,412,510 or Lenher U.S. Patent No. 2,138,276. A detailed list of such agents is set forth in an article in "Soap and Chemical Specialties," vol. 31, No. 7, pages 50–61; No. 8, pages 48–61; No. 9, pages 52–67; and No. 10, pages 38–67 (1955); see also McCutcheon, "Chemical Industries," November 1947, page 8011, entitled "Synthetic Detergents," and Bulletin E–607 of the Bureau of Entomology and Plant Quarantine of the U.S. Dept. of Agriculture. In general, less than 10 percent by weight of surface-active agent is present in the compositions of the invention and the amount of surface-active agent in any given composition can be as low as 1 percent or even less.

Powdered or dust compositions of the invention, whether or not also modified with a surface-active agent, are prepared by mixing the active compounds of the invention with finely-divided inert carriers. Such carriers are preferably talc, natural clays, pyrophyllite, diatomaceous earth and flours such as walnut shell, wheat, soya, redwood and cotton seed flours. Other inert solids which can be used include magnesium, calcium, carbonates, calcium phosphates, sulfur, lime, etc., either in powder or in granular form. The percentages by weight of the active components of the invention and the powdered or dust compositions of the invention will vary according to the manner in which the composition is to be applied, but in general will be from about 0.1 to 95 percent by weight of the herbicidal composition.

Herbicidal compositions containing the components of the invention can also be prepared by dispersing the compositions in an inert non-aqueous carrier. Aliphatic and aromatic hydrocarbons, for example, hydrocarbons of petroleum origin, are preferred as carriers. These dispersions are prepared by milling the compositions of the invention with dispersing agents and suspending agents and the inert liquid carriers in mills such as pebble mills. The amount of the herbicides in the dispersion can range from 10 percent or less to 40 or even 50 percent by weight of the oil dispersion.

Adhesives such as gelatin, blood albumen, resins, for example, rosin, alkyd resins and the like, can also be used in certain compositions to increase retention or tenacity of deposits following application.

Compositions of the invention may be prepared in various ways as follows:

Wettable powders are prepared by combining in a blender the two active components in the desired ratio together with a fluffing diluent as a grinding aid, a wetting agent to assure easy preparation of an aqueous suspension and also a dispersing agent to prevent flocculation in water. These components are blended together, then passed through a hammer mill or other suitable grinding device until the particle size is substantially all below 50 microns. The product is then reblended until homogeneous.

Aqueous dispersions are prepared by mixing the active components, a dispersing agent, and a suspending agent with water and grinding in a pebble mill or sand mill until the insoluble particles are substantially all below 5 microns.

Oil dispersions are prepared in substantially the same way as aqueous dispersions, but in this case the dispersing agent chosen is also an emulsifier for the oil so that the final product can be diluted with water to form a spray emulsion.

Granules are prepared by spraying an aqueous suspension-emulsion of the two active components upon a granular diluent such as granular attapulgite while tumbling the latter to obtain uniform deposition. Alternatively, granules may also be prepared by blending a powdered form of the solid active material with attapulgite or calcium magnesium bentonite, moistening the mix, granulating, and drying, followed by impregnation with the liquid active material (EPTC) by spraying on the dry granules.

Dusts are most frequently prepared by diluting wettable powders with a dense, rapid settling diluent such as micaceous talc by blending the two together in a ribbon or cone blender. Alternatively, where wetting and dispersing agents are undesirable, the active components are first mixed with a minor amount of a fluffing diluent as a grinding aid, micropulverized and then blended with the dense major diluent.

The herbicidal compositions are applied as sprays, dusts or granules to the locus or area to be protected from weeds. Such application can be made directly upon the locus or area to be protected and the weeds thereon during the period of weed infestation in order to destroy the weeds, or, alternatively, the application can be made in advance of an anticipated weed infestation to prevent such infestation. Thus, the compositions can be applied as aqueous foliar sprays or as sprays directly to the surface of the soil. Alternatively, the dry powdered or granulated compositions can be applied directly on the plants or on the soil. For some purposes it will be convenient to use granular forms of the compositions such as in the treatment of pond and lake bottoms or in the treatment of vegetation where it is desirable to get the composition on the soil surface without depositing it on the plant foliage.

The active ingredients are, of course, applied in amounts sufficient to exert the desired herbicidal action. The amount of herbicidally active compounds present in the compositions as actually applied for destroying or preventing weeds will vary with the herbicidal activity of the active ingredients, the purpose for which the application is being made (i.e., whether for short-term or long-term control), the manner of application, the particular weeds for which control is sought, and like variables. Thus, if highly active ingredients are to be used for the control of weed infestations that plague food crops, the compositions containing the active ingredients are normally further diluted with a liquid to form a spray composition or with a powdered solid to give a dust containing relatively low concentrations of active compounds.

The herbicidal compositions as applied in the form of a spray or dust will contain from about 0.02 percent to 95 percent by weight of the combined herbicidally active components. For post-emergence use one might choose to use rates as high as 50 pounds per acre combined active components. For pre-emergence use the rate of application of active components of the invention will range from about 0.25 to 5 pounds per acre for herbicidal s-triazine compounds in the compositions of the invention. Of course, EPTC will be in these formulations according to the ratios expressed earlier. Certain particular usage rates, such as 0.25 to 2 pounds per acre, are preferred. It must be understood that the determination of the proper rate in any given instance is conventional procedure to those skilled in the art of pre-emergence weed control.

Pre-emergence applications of these compositions give effective weed control for a large variety of weed species with a good safety factor for crops. For example, seedling broadleaf weeds, germinating nutsedge and grasses are more effectively controlled by this mixture than they are from either component used alone in total equivalent amounts.

The mixtures could be used for weed control in corn, alfalfa, cotton, potatoes, sugarcane, flax and strawberries.

Some variation in application rates will be caused by the particular type of soil involved in pre-emergence applications. Thus, more highly adsorptive soils can have applied to them higher rates of active components of the invention without affecting crop tolerance to the combinations. In general, however, the rates of application will be those expressed above for the combinations of the invention.

In order that the invention can be better understood, the following examples are given in addition to the examples already given above. The examples illustrate typical herbicidal compositions of the invention, methods for their preparation, herbicidal applications, and the results obtained. The numbers following the tabulated ingredients represent parts by weight of the ingredients in the respective compositions unless otherwise noted.

EXAMPLE 1

*Granular Formulations*

| | Percent |
|---|---|
| N,N-diproplythiolcarbamic acid, ethyl ester (EPTC) | 1.0 |
| 2-methoxy-4,6-bis(ethylamino)-1,3,5-triazine | 1.0 |
| Granular 15–30 mesh attapulgite | 98.0 |

In the preparation of the above composition the triazine is suspended in water as a 10% aqueous suspension. EPTC is dissolved in acetone to yield a 10% solution. Granular attapulgite, 15–30 mesh, is placed in a revolving drum and well agitated. It is sprayed from separate nozzles with the solution of EPTC and the suspension of triazine so that 4 pounds of the solution and 4 pounds of the suspension are applied per 100 pounds of attapulgite. The resulting granular product is dried, then applied with a fertilizer spreader at a rate of 200 pounds per acre. This is used as a pre-emergence treatment for weed control in cotton. This controls weeds such as Johnson grass, crab grass, foxtail, lamb's-quarters, chickweed, rough pigweed, mustard, and velvet leaf.

EXAMPLE 2
Dust

| | Percent |
|---|---|
| 2 - chloro - 4,6 - bis(3 - methoxypropylamino) - 1,3,5 - triazine | 2 |
| N,N-dipropylthiolcarbamic acid, ethyl ester (EPTC) | 2 |
| Attapulgite | 20 |
| Micaceous talc | 76 |

The triazine, EPTC, and attapulgite are first blended and ground through a micropulverizer then reblended with micaceous talc. The composition is applied with a dust spreader at 100 pounds per acre. This is used as a treatment for weed control in asparagus. It is applied before the seedlings emerge and before spears emerge in the spring.

EXAMPLE 3
Wettable Powder

| | Percent |
|---|---|
| 2-chloro-4,6-bis(ethylamino)-1,3,5-triazine | 9.38 |
| N,N - dipropylthiolcarbamic acid, ethyl ester (EPTC) | 25.00 |
| Diatomaceous silica | 63.82 |
| Alkyl naphthalene sulfonic acid, sodium sol | 1.50 |
| Low viscosity methylcellulose | .30 |

The above composition is prepared by blending the components together in a ribbon blender, micropulverizing and reblending. This composition is extended in water and sprayed at a rate of ¾ pound per acre of the triazine and 2 pounds per acre of EPTC, as a pre-emergence treatment to a field sown with corn. Excellent control of germinating annual broadleaves and grasses is obtained. Some retardation of nutsedge growth is noted. The corn is tolerant to combinations of this type.

EXAMPLE 4
Emulsifiable Oil

| | Percent |
|---|---|
| 2 - methylthio - 4,6 - bis - (3 - methoxypropylamino)-1,3,5-triazine | 17.8 |
| N,N-dipropylthiolcarbamic acid, ethyl ester (EPTC) | 22.2 |
| Alcolated naphthalene (principally alpha methyl naphthalene) | 55 |
| Alkyl aryl polyether alcohol | 5 |

This composition is prepared by simply mixing the components. It is emulsified in water for application. When applied at a rate of 4 pounds per acre of the herbicidal triazine and 5 pounds per acre of EPTC, excellent weed control is obtained in sugar cane fields. Control of seedling Johnson grass, crabgrass, foxtail, pigweed and lamb's-quarters is attained. Severe retardation of nutsedge is noted.

EXAMPLE 5
Granular

| | Percent |
|---|---|
| 2-methylthio-4,6-bis(3-methoxypropylamino)-1,3,5-triazine | 1.5 |
| N,N-dipropylthiolcarbamic acid, ethyl ester (EPTC) | 3.0 |
| Granular attapulgite | 95.5 |

This granular is prepared in the same manner as described in Examples 1 and 4. This composition is applied by conventional means at a rate of 100 pounds per acre. It is effective for weed control in soybeans. Grasses, such as foxtails, crabgrass, and seedling Johnson grass and broadleaf weeds, such as pigweed, and lamb's-quarters are controlled.

The claims are:

1. A process for the destruction and prevention of weeds which comprises applying to the locus to be protected an herbicidally effective amount of ethyl N,N-dipropylthiolcarbamate mixed together with an herbicidally effective amount of at least one s-triazine compound selected from the formula:

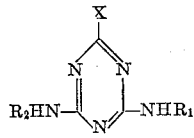

where:
X is selected from the group consisting of chlorine, methoxy, and methylthio,
$R_1$ and $R_2$ are selected from the group consisting of alkyl radicals containing less than four carbon atoms, and the radical $-(CH_2)_n-OCH_3$, and
$n$ is an integer selected from the group consisting of 2 and 3.

2. A process for pre-emergence weed control in agricultural crops which comprises applying to a locus to be protected an herbicidally effective amount of ethyl N,N-dipropylthiolcarbamate mixed together with an herbicidally effective amount of at least one s-triazine selected from the formula:

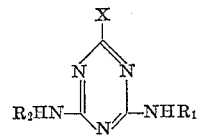

where:
X is selected from the group consisting of chlorine, methoxy, and methylthio,
$R_1$ and $R_2$ are selected from the group consisting of alkyl radicals containing less then four carbon atoms, and the radical $-(CH_2)_n-OCH_3$, and
$n$ is an integer selected from the group consisting of 2 and 3.

3. An herbicidal composition comprising a mixture of an herbicidally effective amount of ethyl N,N-dipropylthiolcarbamate with an herbicidally effective amount of at least one s-triazine selected from the formula:

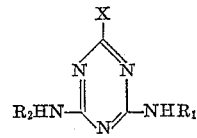

where:
X is selected from the group consisting of chlorine, methoxy, methylthio,
$R_1$ and $R_2$ are selected from the group consisting of alkyl radicals containing less than four carbon atoms, and the radical $-(CH_2)_n-OCH_3$, and
$n$ is an integer selected from the group consisting of 2 and 3.

References Cited in the file of this patent

UNITED STATES PATENTS

| 2,720,480 | Wolf | Oct. 11, 1955 |
| 2,891,855 | Gysin et al. | June 23, 1959 |
| 2,909,420 | Gysin et al. | Oct. 20, 1959 |
| 2,913,327 | Tilles et al. | Nov. 17, 1959 |

FOREIGN PATENTS

| 1,135,848 | France | May 3, 1957 |

OTHER REFERENCES

Martin: "A Guide to the Chemicals Used in Crop Protection," 3rd edition, October 1957, page S4.